US010437406B2

(12) United States Patent
Hagihara et al.

(10) Patent No.: US 10,437,406 B2
(45) Date of Patent: Oct. 8, 2019

(54) TOUCH PANEL

(71) Applicant: FUJITSU COMPONENT LIMITED, Tokyo (JP)

(72) Inventors: Hideyuki Hagihara, Tokyo (JP); Shozo Furukawa, Tokyo (JP); Takuya Ozawa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/685,245

(22) Filed: Aug. 24, 2017

(65) Prior Publication Data

US 2018/0088710 A1    Mar. 29, 2018

(30) Foreign Application Priority Data

Sep. 26, 2016  (JP) ................. 2016-187161

(51) Int. Cl.
*G06F 3/045* (2006.01)
*G06F 3/047* (2006.01)
*G02F 1/1333* (2006.01)

(52) U.S. Cl.
CPC .......... *G06F 3/045* (2013.01); *G02F 1/13338* (2013.01); *G06F 3/047* (2013.01); *G06F 2203/04103* (2013.01); *G06F 2203/04113* (2013.01)

(58) Field of Classification Search
CPC .......... G06F 3/041–0416; G06F 3/047; G02F 1/13338
See application file for complete search history.

(56) References Cited

U.S. PATENT DOCUMENTS

| | | | | |
|---|---|---|---|---|
| 9,977,544 | B2 * | 5/2018 | Chiu | G06F 3/044 |
| 2011/0242057 | A1 * | 10/2011 | Lee | G06F 3/041 |
| | | | | 345/176 |
| 2012/0026107 | A1 * | 2/2012 | Kim | G06F 3/044 |
| | | | | 345/173 |
| 2012/0033168 | A1 * | 2/2012 | Hwang | G02F 1/13338 |
| | | | | 349/139 |
| 2012/0113043 | A1 * | 5/2012 | Liu | G06F 3/044 |
| | | | | 345/174 |

(Continued)

FOREIGN PATENT DOCUMENTS

| | | |
|---|---|---|
| CN | 104508608 | 4/2015 |
| JP | 2014-146138 | 8/2014 |

(Continued)

OTHER PUBLICATIONS

Espacenet English Abstract for Taiwanese Pub. No. 201609997, published Mar. 16, 2016.

(Continued)

*Primary Examiner* — David Tung
(74) *Attorney, Agent, or Firm* — Staas & Halsey LLP

(57) ABSTRACT

A touch panel including: a substrate that includes an operation surface and a transparent conductive film formed opposite to the operation surface; a wiring pattern that is disposed below the transparent conductive film; and a decorative layer that is disposed between the transparent conductive film and the wiring pattern, and is composed of a chromatic color conductive ink which conducts the transparent conductive film and the wiring pattern.

5 Claims, 4 Drawing Sheets

(56) References Cited

U.S. PATENT DOCUMENTS

| | | | | |
|---|---|---|---|---|
| 2013/0088281 | A1* | 4/2013 | Wang | G06F 3/044 327/517 |
| 2013/0092520 | A1* | 4/2013 | Lee | G06F 3/044 200/600 |
| 2016/0011704 | A1* | 1/2016 | Chiu | G06F 1/1643 345/173 |
| 2016/0040023 | A1 | 2/2016 | Ishii et al. | |
| 2016/0077626 | A1* | 3/2016 | Yeh | G06F 3/044 345/174 |
| 2016/0117018 | A1 | 4/2016 | Lin et al. | |
| 2016/0117032 | A1* | 4/2016 | Lin | G06F 3/044 345/173 |
| 2017/0002225 | A1 | 1/2017 | Asada et al. | |
| 2017/0145257 | A1 | 5/2017 | Osada et al. | |

FOREIGN PATENT DOCUMENTS

| | | |
|---|---|---|
| JP | 2015-183044 | 10/2015 |
| TW | 201219905 | 5/2012 |
| TW | 201444923 | 12/2014 |
| TW | 201609997 | 3/2016 |
| TW | 201612710 | 4/2016 |
| TW | 201616309 | 5/2016 |

OTHER PUBLICATIONS

J-Plat Pat English Abstract for Japanese Pub. No. 2015-183044, published Oct. 22, 2015.

Espacenet English Abstract for Chinese Pub. No. 104508608, published Apr. 8, 2015.

Espacenet English Abstract for Taiwanese Pub. No. 201444923, published Dec. 1, 2014.

Espacenet English Abstract for Taiwanese Pub. No. 201612710, published Apr. 1, 2016.

Espacenet English Abstract for Taiwanese Pub. No. 201616309, published May 1, 2016.

Japanese Platform for Patent Information English Abstract for Japanese Publication No. 2014-146138, published Aug. 14, 2014.

Taiwan Office Action dated Oct. 22, 2018 in Taiwan Patent Application No. 106127236.

Taiwan Office Action dated Mar. 28, 2019 in Taiwan Patent Application No. 106127236.

* cited by examiner

TOUCH PANEL

CROSS-REFERENCE TO RELATED APPLICATION

This application is based upon and claims the benefit of priority of the prior Japanese Patent Application No. 2016-187161 filed on Sep. 26, 2016, the entire contents of which are incorporated herein by reference.

FIELD

A certain aspect of the embodiments is related to a touch panel.

BACKGROUND

There has been conventionally known a resistive film type touch panel (Japanese Laid-open Patent Publication No. 2014-146138). In such a touch panel, a decorative film is pasted on an upper substrate through an OCA (Optical Clear Adhesive). However, when the decorative film is pasted on the upper substrate, an input load of the touch panel increases. Therefore, there is a problem that an operation feeling of the touch panel is deteriorated and a manufacturing cost increases.

On the other hand, there has been also known a resistive film type touch panel without the decorative film and the OCA by directly printing a decorative layer on the transparent conductive film of the upper substrate. In the touch panel, as compared with the touch panel with the decorative film, the operation feeling of the touch panel is improved and the manufacturing cost is reduced.

SUMMARY

According to an aspect of the present invention, there is provided a touch panel including: a substrate that includes an operation surface and a transparent conductive film formed opposite to the operation surface; a wiring pattern that is disposed below the transparent conductive film; and a decorative layer that is disposed between the transparent conductive film and the wiring pattern, and is composed of a chromatic color conductive ink which conducts the transparent conductive film and the wiring pattern.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When the decorative layer is directly printed on the transparent conductive film of the upper substrate as described above, there is a limitation on a color of a conductive ink constituting the decorative layer, and hence there is a problem that the decorative layer is limited to monochromatic printing of an achromatic color such as black or white.

A description will now be given of embodiments according to the present invention with reference to drawings.

Figure 1:
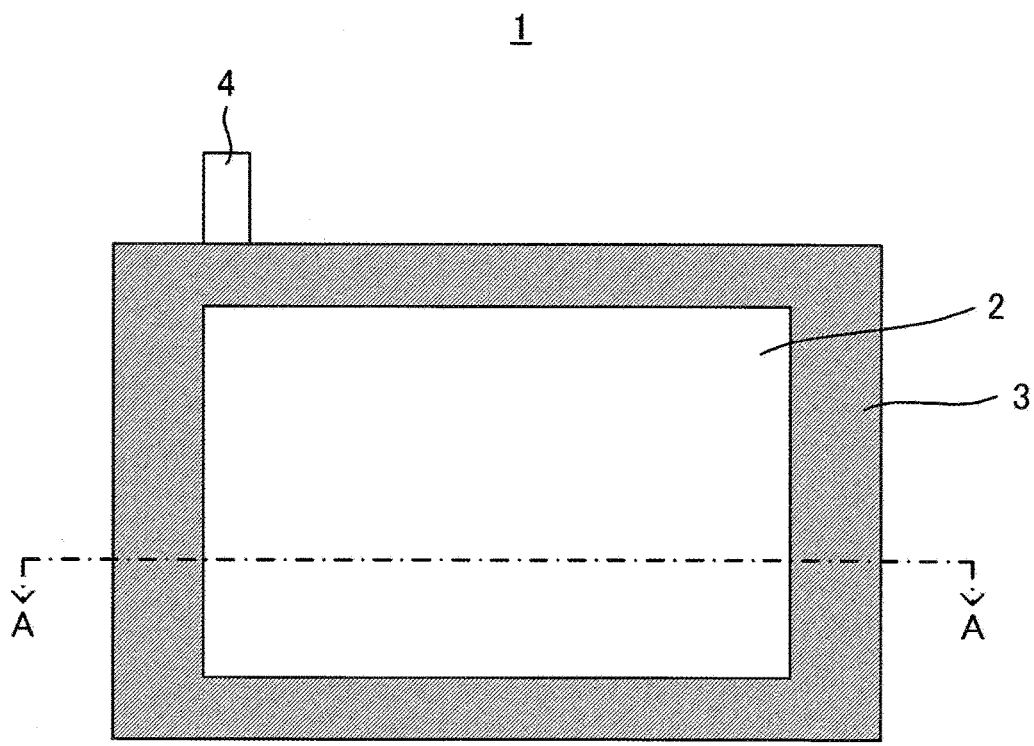
FIG. 1 is a front view of a touch panel according to a present embodiment.

FIG. 1 is a front view of a touch panel according to a present embodiment. A touch panel 1 of FIG. 1 is a four-wire resistive film type touch panel, but may be a five-wire or seven-wire resistive film type touch panel. The touch panel 1 includes an operation area 2 that receives a touch input, and a non-operation area 3 that does not receive the touch input. The operation area 2 has a transparent rectangular shape, and is formed in the center of the touch panel. The non-operation area 3 is a rectangular annular area with a predetermined width, and is formed so as to surround the operation area 2. Moreover, an FPC 4 (Flexible printed circuit) that outputs an input signal by the touch input to the outside is connected to the touch panel 1.

Figure 2A:
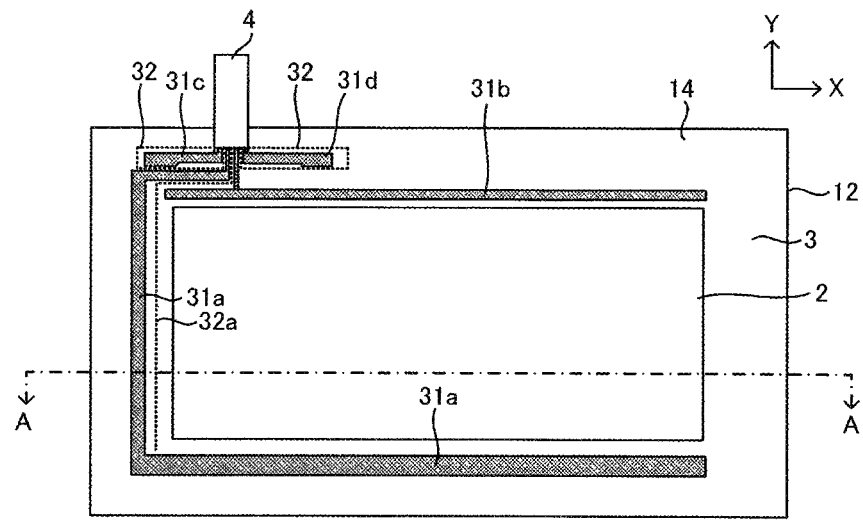
FIG. 2A is a diagram illustrating a lower substrate of the touch panel.
Figure 2B:
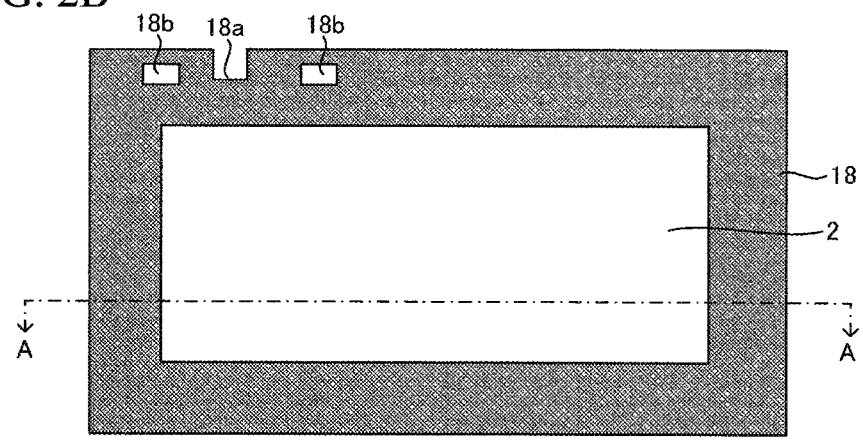
FIG. 2B is a diagram illustrating an adhesive layer of the touch panel.
Figure 2C:
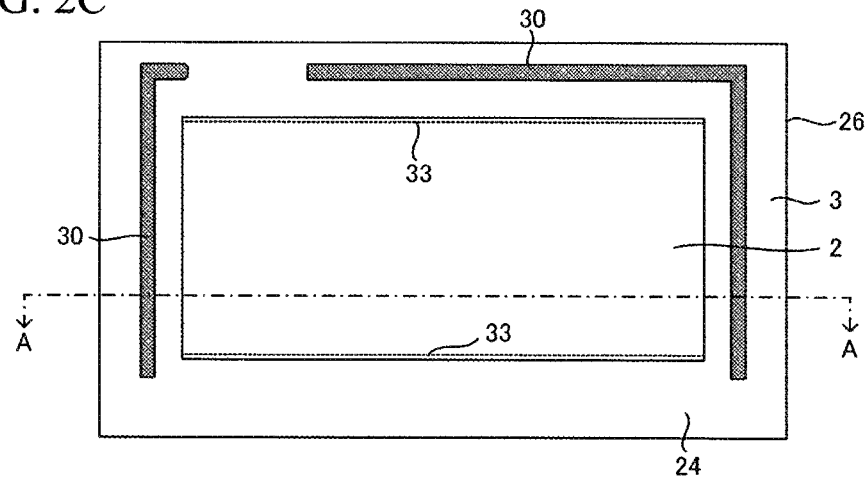
FIG. 2C is a diagram illustrating an upper substrate of the touch panel.

FIG. 2A is a diagram illustrating a lower substrate of the touch panel 1. FIG. 2B is a diagram illustrating an adhesive layer of the touch panel 1. FIG. 2C is a diagram illustrating an upper substrate of the touch panel 1.

Wiring patterns 31a to 31d are formed on the non-operation area 3 of a lower substrate 12, and respective one ends of the wiring patterns 31a to 31d are connected to the FPC 4. Each of the wiring patterns 31a to 31d is composed of a silver paste, for example. The wiring patterns 31a and 31b are laid from the FPC 4 to the vicinity of the operation area 2, are extended in parallel to sides in an X-direction of the operation area 2, and generate an electric potential distribution in a Y-direction. The wiring patterns 31c and 31d contact wiring patterns 30 of an upper substrate 26 of FIG. 2C via through-holes 18b of an adhesive layer 18 of FIG. 2B.

A transparent conductive film 14 around the wiring patterns 31c and 31d includes areas 32 removed by etching. This is because each of the wiring patterns 31c and 31d is insulated from the wiring patterns 31a and 31b. An area 32a of a part of the transparent conductive film 14 located between the wiring pattern 31a and the operation area 2 is removed by the etching. The area 32a is formed to prevent the wiring pattern 31a from affecting the electric potential distribution in the Y-direction.

The adhesive layer 18 is bonded to the non-operation area 3 of the upper substrate 26 and the non-operation area 3 of the lower substrate 12. The adhesive layer 18 includes a cutout part 18a for not bonding with the FPC 4, and the through-holes 18b for contacting the wiring patterns 31c and 31d to the wiring pattern 30.

The wiring patterns 30 are formed on the non-operation area 3 of the upper substrate 26 of FIG. 2C. The wiring patterns 30 are laid to the vicinity of sides in the Y-direction of the operation area 2, are extended in parallel to the sides in the Y-direction of the operation area 2, and generate an electric potential distribution in the X-direction. Moreover, an etching area 33 is formed on a transparent conductive film 24 to prevent a part in the X-direction of the wiring patterns 30 from affecting the electric potential distribution in the X-direction.

Figure 3:
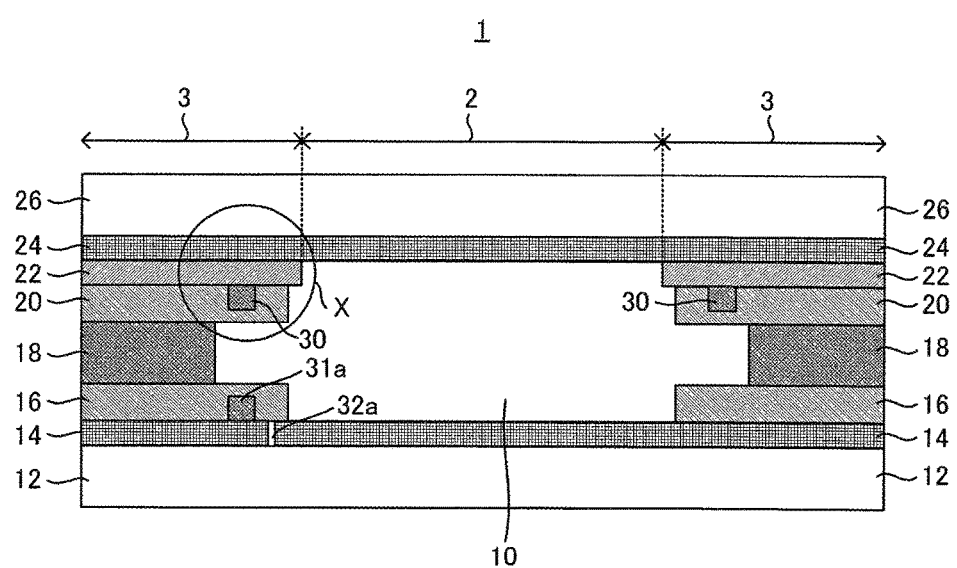
FIG. 3 is a cross section diagram illustrating the touch panel taken along line A-A in FIG. 1.

FIG. 3 is a cross section diagram illustrating the touch panel 1 taken along line A-A in FIG. 1.

The touch panel 1 includes the lower substrate 12, the transparent conductive films 14 and 24, insulating printed layers 16 and 20, the adhesive layer 18, a decorative layer 22, the upper substrate 26 and the wiring pattern 30. An upper surface of the upper substrate 26 composed of a transparent PET (Polyethylene Terephthalate) film is an operation surface, and the transparent conductive film 24 is formed on a lower surface of the upper substrate 26. The transparent conductive films 14 and 24 are composed of a so-called ITO (Indium Tin Oxide).

The decorative layer 22 for hiding the wiring patterns 30 and 31a is formed immediately below the transparent conductive film 24 of the non-operation area 3. The insulating printed layer 20 and the wiring pattern 30 are formed immediately below the decorative layer 22. The wiring pattern 30 is composed of the silver paste, for example, and is covered by the insulating printed layer 20.

The transparent conductive film 14 is formed on an upper surface of the lower substrate 12 composed of glass. The insulating printed layer 16 and the wiring pattern 31a are formed on the non-operation area 3 of the transparent conductive film 14. The wiring pattern 31a is covered by the insulating printed layer 16. The area 32a of the part of the transparent conductive film 14 located between the wiring pattern 31a and the operation area 2 is removed by the etching.

The adhesive layer 18 composed of a double-sided tape is disposed between the insulating printed layers 16 and 20, and bonds the insulating printed layers 16 and 20 to each other. A space 10 is formed between the operation areas of the transparent conductive films 14 and 24. Dot spacers, not shown, are disposed in the space 10.

Figure 4A:
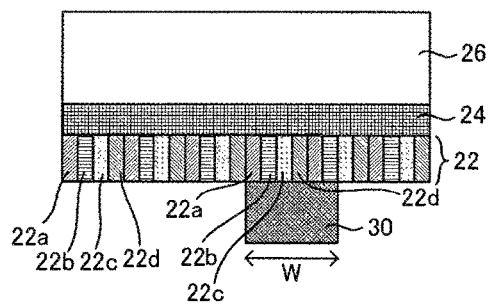
FIG. 4A is an enlarged view of an area X in FIG. 3.
Figure 4B:
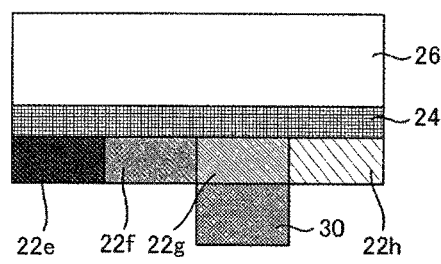
FIG. 4B is a diagram illustrating a first variation of FIG. 4A.
Figure 4C:
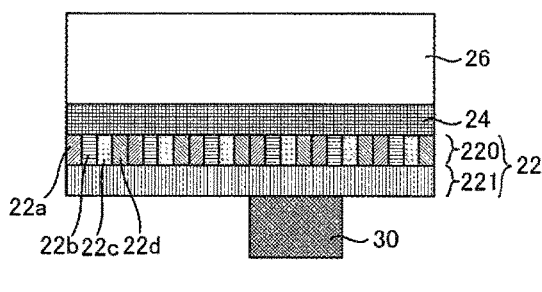
FIG. 4C is a diagram illustrating a second variation of FIG. 4A.
Figure 4D:
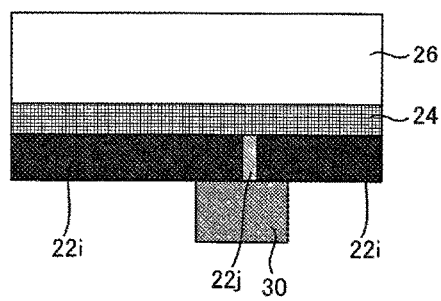
FIG. 4D is a diagram illustrating a third variation of FIG. 4A.

FIG. 4A is an enlarged view of an area X in the vicinity of the decorative layer 22 of FIG. 3. FIG. 4B is a diagram illustrating a first variation of FIG. 4A. FIG. 4C is a diagram illustrating a second variation of FIG. 4A. FIG. 4D is a diagram illustrating a third variation of FIG. 4A.

The decorative layer 22 is formed by printing an ink directly on the transparent conductive film 24 by dot printing of the inkjet or screen printing. The ink constituting the decorative layer 22 is chromatic color inks such as cyan (C), magenta (M) or yellow (Y), or achromatic color inks of white (W) or black (B). At least one of the chromatic color inks and the achromatic color inks constituting the decorative layer 22 is a conductive ink. That is, at least one of the inks of the cyan (C), the magenta (M), the yellow (Y), the white (W) and the black (B) is the conductive ink. A chromatic color conductive ink is formed by mixing a chromatic color dye in a transparent conductive ink.

For example, in FIG. 4A, the decorative layer 22 is formed by the inks of cyan 22a, magenta 22b, yellow 22c and black 22d. For example, when the cyan 22a is the conductive ink and the magenta 22b, the yellow 22c and the black 22d are non-conductive inks, the wiring pattern 30 can be conducted to the transparent conductive film 24 through the cyan 22a connected to the wiring pattern 30.

Thus, by forming the colorful decorative layer 22 by using at least one chromatic color conductive ink, it is possible to ensure the conduction between the wiring pattern 30 and the transparent conductive film 24 via the conductive ink, and to improve the design of the decorative layer 22.

It is preferable that a density of the chromatic color or achromatic color conductive ink disposed directly above the wiring pattern 30 is 20% or more of a width W of the wiring pattern 30, i.e., 20% or more of the width in a short direction of the wiring pattern 30. This is because, when the density of the chromatic color or achromatic color conductive ink disposed directly above the wiring pattern 30 is low, i.e., the density of the conductive ink is less than 20% of the width W of the wiring pattern 30, a resistance value between the wiring pattern 30 and the transparent conductive film 24 increases, distortion occurs in a potential gradient generated between two opposed wiring patterns 30, a potential gradient necessary for position detection is not obtained, and an area size of the operation area 2 cannot be widened.

In FIG. 4B, the decorative layer 22 is formed of a conductive ink of the cyan having different dot sizes. For example, an order of the dot size is cyan 22e>cyan 22f>cyan 22g>cyan 22h. Thus, it is possible to form gradation in the decorative layer 22 by using the chromatic color conductive ink. Here, it is also possible to form the gradation with use of other chromatic color.

In FIG. 4C, the decorative layer 22 includes a first decorative layer 220 formed immediately below the transparent conductive film 24, and a second decorative layer 221 disposed between the first decorative layer 220 and the wiring pattern 30. The second decorative layer 221 is formed by a black conductive ink to ensure a light-shielding property, for example. Here, the color of the conductive ink of the second decorative layer 221 is not limited to black.

The first decorative layer 220 is formed by the inks of the cyan 22a, the magenta 22b, the yellow 22c and the black 22d. The cyan 22a is the conductive ink, and the magenta 22b, the yellow 22c and the black 22d are non-conductive inks. In this case, the wiring pattern 30 is conducted to the transparent conductive film 24 via the black non-conductive ink of the second decorative layer 221 connected to the wiring pattern 30, and the conductive ink of the cyan 22a of the first decorative layer 220.

In FIG. 4A, only the cyan 22a connected to the wiring pattern 30 is a conduction path that flows a current. On the other hand, in FIG. 4C, the second decorative layer 221 having a larger width than the width W of the wiring pattern 30 is composed of the conductive ink, and therefore the conduction path increases and the resistance value reduces, as compared with FIG. 4A. As a result, the wiring pattern 30 can be stably conducted to the transparent conductive film 24.

In FIG. 4D, the decorative layer 22 is formed by white 22i which is the non-conductive ink and black 22j which is the conductive ink. The width of the black 22j is about 80 μm, for example. The width corresponds to one dot when the ink is printed with 300 dpi. In this case, since the black 22j which is the conductive ink is a print pattern having a thin stripe parallel to the wiring pattern 30, it is possible to realize white printing in appearance. Here, the non-conductive ink of another color and the conductive ink of another color may be used as substitute for the non-conductive ink of the white 22i and the conductive ink of the black 22j, respectively. Moreover, in FIG. 4D, the colors of the non-conductive ink and the conductive ink differ from each other, but the colors of the non-conductive ink and the conductive ink may be the same as each other.

As described above, according to the present embodiment, the touch panel 1 includes: the upper substrate 26 that includes an operation surface and the transparent conductive film 24 formed opposite to the operation surface; the wiring pattern 30 that is disposed below the transparent conductive film 24; and the decorative layer 22 that is disposed between the transparent conductive film 24 and the wiring pattern 30, and is composed of the chromatic color conductive ink which conducts the transparent conductive film 24 and the wiring pattern 30. Therefore, it is possible to ensure the conduction between the wiring pattern 30 and the transparent conductive film 24 via the chromatic color conductive ink, and to improve the design of the decorative layer 22.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch panel comprising:
    an upper substrate that includes an operation surface;
    an upper transparent conductive film formed opposite to the operation surface, having an operation area for receiving a touch input, a non-operation area for not receiving the touch input, and a first etching area in which a part of the upper transparent conductive film in the non-operation area is removed, the non-operation area surrounding the operation area;
    an upper wiring pattern that is disposed below the upper transparent conductive film in the non-operation area and surrounds the operation area;
    a decorative layer that is disposed between the upper transparent conductive film and the upper wiring pattern, and is composed of a chromatic color conductive ink which conducts the upper transparent conductive film and the upper wiring pattern;
    an upper insulating printed layer disposed immediately below the decorative layer and covering the upper wiring pattern;
    a lower substrate having an upper surface;
    a lower transparent conductive film formed on the upper surface of the lower substrate, having the operation area, the non-operation area, and a second etching area in which a part of the lower transparent conductive film in the non-operation area is removed;
    a lower wiring pattern that is disposed on the lower transparent conductive film in the non-operation area and surrounds the operation area;
    a lower insulating printed layer disposed immediately on the non-operation area of the lower transparent conductive film and covering the lower wiring pattern; and
    an adhesive layer disposed between the upper and the lower insulating printed layers, and bonding the upper insulating printed layer to the lower insulating printed layer,
    wherein
        the first etching area is formed in parallel with a part of the upper wiring pattern extending along a first direction, and is disposed between the operation area and a position on the upper transparent conductive film where the upper wiring pattern is disposed, and
        the second etching area is formed in parallel with a part of the lower wiring pattern extending along a second direction vertical to a first direction, and is disposed between the operation area and a position on the lower transparent conductive film where the lower wiring pattern is disposed.

2. The touch panel as claimed in claim 1, wherein the decorative layer includes a first decorative layer that is formed on a lower surface of the upper transparent conductive film and includes the chromatic color conductive ink, and a second decorative layer that is disposed between the first decorative layer and the upper wiring pattern, conducts the first decorative layer and the upper wiring pattern, and has a larger width than a width of the upper wiring pattern.

3. The touch panel as claimed in claim 1, wherein a width of the decorative layer is larger than a width of the upper wiring pattern.

4. The touch panel as claimed in claim 1, wherein the decorative layer further includes a chromatic color or achromatic color non-conductive ink that insulates the upper transparent conductive film and the upper wiring pattern.

5. The touch panel as claimed in claim 1, wherein the chromatic color conductive ink includes a transparent conductive ink and a chromatic color dye.

* * * * *